(12) United States Patent
Halbweiss et al.

(10) Patent No.: US 7,497,499 B2
(45) Date of Patent: Mar. 3, 2009

(54) CONVERTIBLE VEHICLE HAVING A ROOF STORABLE IN A STORAGE COMPARTMENT

(75) Inventors: Thomas Halbweiss, Remseck (DE); Kristian Franz, Stuttgart (DE); Horst Meier, Filderstadt (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 312 days.

(21) Appl. No.: 11/531,195

(22) Filed: Sep. 12, 2006

(65) Prior Publication Data

US 2007/0057529 A1    Mar. 15, 2007

(30) Foreign Application Priority Data

Sep. 12, 2005    (DE) ....................... 10 2005 043 511

(51) Int. Cl.
  *B60J 7/20*    (2006.01)
(52) U.S. Cl. ............. 296/128; 296/107.08; 296/107.17; 296/136.06
(58) Field of Classification Search ................. 296/121, 296/124, 128, 107.08, 107.17, 136.06; 292/DIG. 5
See application file for complete search history.

(56) References Cited

U.S. PATENT DOCUMENTS

| 5,533,777 | A | * | 7/1996 | Kleemann et al. ........... 296/117 |
| 5,839,778 | A | | 11/1998 | Schaible et al. |
| 6,168,224 | B1 | | 1/2001 | Henn et al. |
| 6,270,144 | B1 | * | 8/2001 | Schenk .................... 296/107.08 |
| 7,073,846 | B2 | * | 7/2006 | Borg et al. .............. 296/187.13 |
| 7,118,162 | B2 | * | 10/2006 | Queveau et al. ............. 296/108 |
| 7,309,099 | B2 | * | 12/2007 | Netzel et al. ................. 296/108 |
| 2005/0285428 | A1 | * | 12/2005 | Dilluvio ................. 296/107.08 |
| 2006/0125280 | A1 | * | 6/2006 | Guillez et al. .......... 296/107.01 |
| 2006/0131920 | A1 | * | 6/2006 | Queveau et al. ........ 296/107.08 |
| 2007/0182196 | A1 | * | 8/2007 | Roder ......................... 296/76 |
| 2008/0191513 | A1 | * | 8/2008 | Theodore et al. ............ 296/108 |

FOREIGN PATENT DOCUMENTS

DE    101 49 229 A1    5/2003
DE    103 39 816 A1    4/2005

* cited by examiner

*Primary Examiner*—Jason S Morrow
(74) *Attorney, Agent, or Firm*—Brooks Kushman P.C.

(57) ABSTRACT

A vehicle includes a roof, a compartment, and a lid. A roof kinematic system moves the roof between a closed position and a stored position in which the roof is in the compartment. The lid is movable between a closed position in which the lid covers the compartment and an opened position. First and second locks include respective closing parts movable between locked and unlocked positions. A shared kinematic system connects the closing parts to synchronously move them together. When the roof is in its stored position within the compartment and the lid is in its closed position over the compartment, the shared kinematic system moves the closing parts to their locked position such that the first part interacts with the roof and locks the roof within the compartment and the second part interacts with the lid and locks the lid over the compartment.

16 Claims, 4 Drawing Sheets

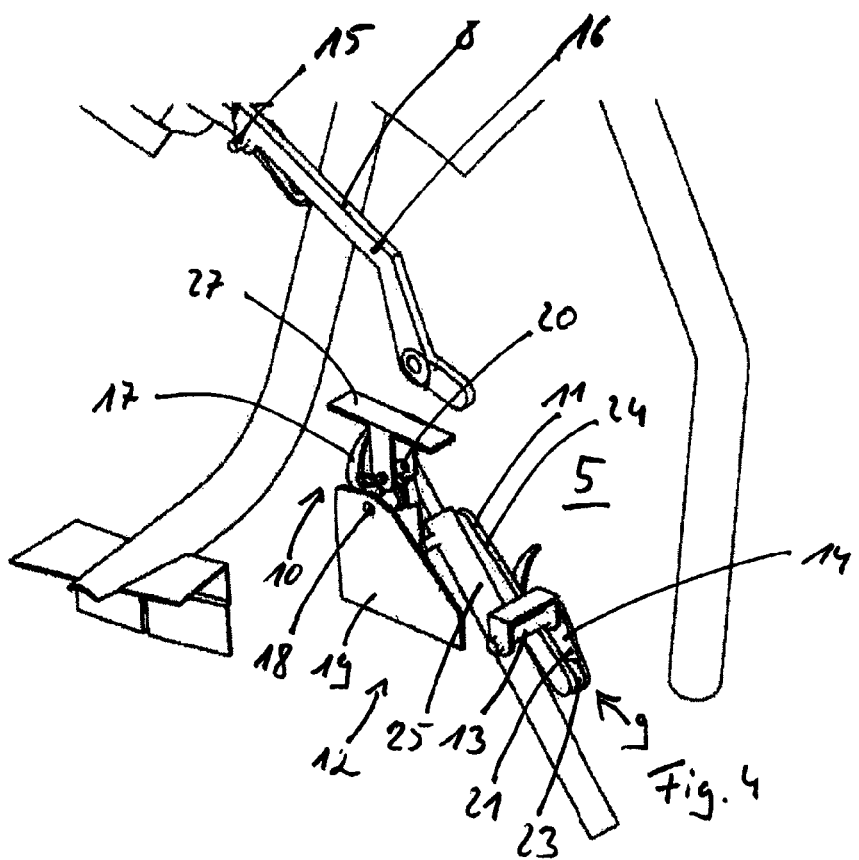
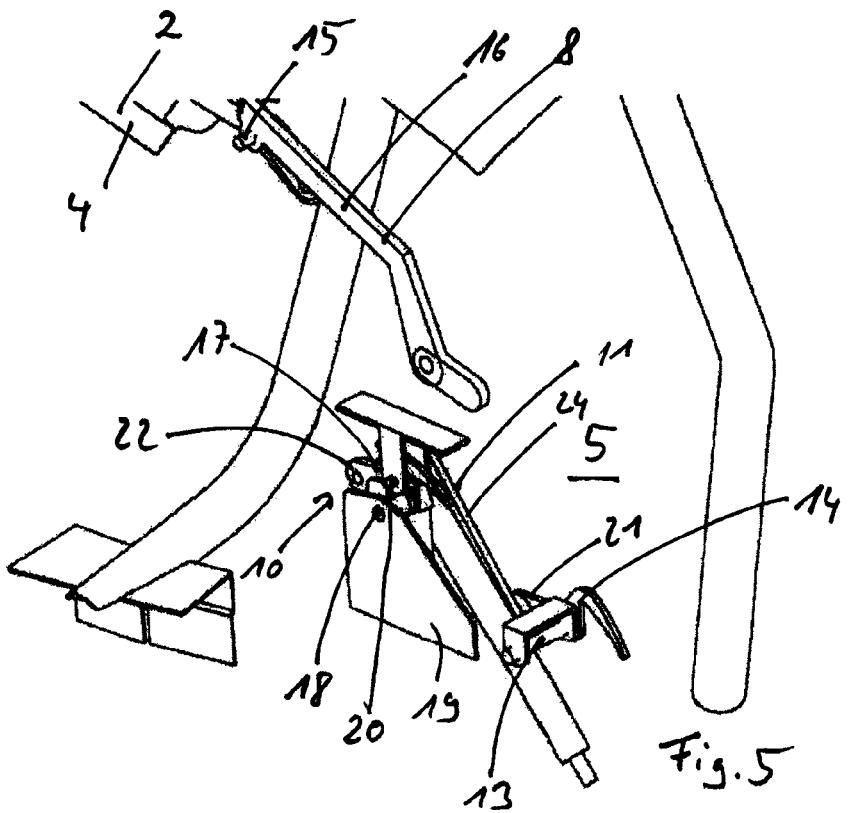

CONVERTIBLE VEHICLE HAVING A ROOF STORABLE IN A STORAGE COMPARTMENT

CROSS-REFERENCE TO RELATED APPLICATIONS

This application claims foreign priority benefits under 35 U.S.C. § 119(a)-(d) to DE 10 2005 043 511.4, filed Sep. 12, 2005, which is hereby incorporated by reference in its entirety.

BACKGROUND OF THE INVENTION

1. Field of the Invention

The present invention relates to a convertible vehicle having a roof movable by a roof kinematic system between a closed position in which the roof covers the vehicle interior and a stowed position in which the roof is lowered and stored in a rear storage compartment of the vehicle.

2. Background Art

DE 195 07 431 C1 (corresponds to U.S. Pat. No. 5,839,778) describes a vehicle having a multi-part, lowerable hardtop roof movable between closed and stowed positions. The roof includes front and rear roof parts. A locking device situated in a region of the front section of the front roof part locks the roof to the front windshield frame of the vehicle when the roof is in the closed position. The locking device also locks the roof in the stowed position in which the roof is stored in the rear storage compartment of the vehicle. When the roof is in the stowed position and stored in the storage compartment, a locking hook of the locking device engages with a retaining block fixed to the vehicle body to prevent unintentional motion of the stored roof. A hydraulic cylinder on the front roof part functions as a drive for actuating the locking device. The reference does not mention the possibility of locking a storage compartment lid covering the storage compartment.

DE 101 49 229 B4 describes a vehicle roof locking device. A locking hook of this locking device together with a kinematic closing system for actuating the locking hook is integrated into the storage compartment and may thus be actuated independently from a locking device for locking the roof to the front windshield frame. This reference does not mention the possibility of locking a storage compartment lid covering the storage compartment.

DE 196 50 402 C2 (corresponds to U.S. Pat. No. 6,168,224) describes a storage compartment lid for a vehicle. A self-contained locking device locks the storage compartment. A drive such as a geared motor for swivelling the storage compartment lid actuates a kinematic closing system of the locking device. This reference does not mention the possibility of locking a movable vehicle roof in its stored position.

SUMMARY OF THE INVENTION

An object of the present invention is to provide a convertible vehicle in which a vehicle roof top which may be efficiently locked in its stowed (or stored) position within a rear storage compartment of the vehicle and a storage compartment lid for the storage compartment may be efficiently locked in its closed position.

In carrying out the above object and other objects, the present invention provides a convertible vehicle having a roof, a rear storage compartment, and a storage compartment lid. The lid is movable between a closed position in which the lid covers the compartment and an opened position in which the lid exposes the compartment. The roof is movable between a closed position covering the vehicle interior and a stored position in which the roof is lowered into the compartment for storage therein. A roof kinematic system is connected to the roof for moving the roof between its closed and stored positions. The vehicle further includes first and second locking devices and a shared kinematic closing system. The first locking device includes a first closing part movable between a locked position and an unlocked position. The second locking device includes a second closing part movable between a locked position and an unlocked position. The shared kinematic closing system connects the first and second closing parts to synchronously move the first and second closing parts together between their locked and unlocked positions. When the roof is in its stored position within the compartment and the lid is in its closed position over the compartment, the shared kinematic closing system moves the first and second closing parts to their locked position such that the first closing part interacts with the roof and locks the roof within the compartment and such that the second closing part interacts with the lid and locks the lid over the compartment.

In accordance with an embodiment of the present invention, a vehicle roof is movable by a roof kinematic system between a closed position in which the roof covers the vehicle interior and a stowed (or stored) position in which the roof is lowered into and stored within a rear storage compartment of the vehicle thereby exposing the vehicle interior. A storage compartment lid is movable between a closed position in which the lid covers the compartment and an opened position in which the lid exposes the compartment.

A first locking device locks the roof in its stored position within the compartment and a second locking device locks the lid in its closed position over the compartment. The first locking device includes a first closing part movable between a locked position and an unlocked position. In its locked position, the first closing part interacts with a corresponding first closing counterpart fixed to the roof such that the first locking device locks the roof in its stored position within the compartment. The second locking device includes a second closing part movable between a locked position and an unlocked position. In its locked position, the second closing part interacts with a corresponding second closing counterpart fixed to the lid such that the second locking device locks the lid in its closed position over the compartment.

A kinematic closing system couples the first and second locking devices to move the first and second closing parts between their locked and unlocked positions. The first and second locking devices share the kinematic closing system such that the motion of the first and second closing parts between their locked and unlocked positions occurs synchronously. That is, the shared kinematic closing system couples the motion sequence of the first and second closing parts of the first and second locking devices. The shared kinematic closing system advantageously couples the first and second closing parts such that both closing parts may be jointly converted from their respective locked positions to their respective unlocked positions and vice versa.

Because the locking and unlocking motions of the first and second closing parts are coupled, the second closing part is disengaged when the roof is in its closed position. In the closed position of the roof, the second closing part cannot engage with the corresponding second closing counterpart. When the roof is in its stored position and stored within the compartment, the first closing part moves to its locked position to lock the roof within the compartment thereby preventing the stored roof from vibrating during vehicle travel. Simultaneously, the second closing part moves to its locked position to lock the lid over the compartment thereby avoiding, in particular, wind noise during vehicle travel. As such, the locking of the roof in its stored position within the compartment and the locking of the lid in its closed position over the compartment are combined in a particularly effective manner.

For optimum locking of the roof and the lid, it may be practical to use multiple pairs of first and second locking devices. Such pairs of locking devices are coupled to one another and separated at a distance from one another. For example, two pairs of locking devices may be respectively provided in the two oppositely adjacent side regions of the compartment. In addition, the pairs of locking devices may be coupled to one another (for instance, by the shared kinematic closing system) such that the motion of all of the movable closing parts are synchronized with one another.

In an embodiment, both of the first and second movable closing parts of the first and second locking devices are fixed to the vehicle body. The first closing part interacts with the first corresponding closing counterpart for the first locking device. The first corresponding closing counterpart is fixed to the roof and may be embodied as a retaining block or a retaining bolt. The second closing part interacts with the second corresponding closing counterpart for the second locking device. The second corresponding closing counterpart is fixed on the lid. Of course, the closing counterparts may be provided elsewhere such as on the roof kinematic system or the shared kinematic closing system. The locking of the roof within the compartment and the lid over the compartment are ensured by the, in particular, positive-fit interaction of the movable closing parts with the corresponding static closing counterparts. Attaching the closing parts to the vehicle body or to component(s) fixed to the vehicle body has the advantage that connecting lines for a drive for moving the closing parts may be concealed behind the vehicle body trim or within the vehicle body.

In an embodiment, the first and second closing parts are on the lid or on a kinematic system for the lid. In either case, the two movable closing parts participate in the swivelling motion of the lid between its closed and opened positions. As such, it is possible to lock the roof within the compartment and lock the lid over the compartment when the lid is in its closed position.

In an embodiment, the first and second locking devices share an actuator which moves the first and second closing parts. The use of the shared actuator is possible and beneficial on account of the shared kinematic closing system for the first and second closing parts. Separate actuators for each individual movable closing part may advantageously be omitted thereby reducing material costs. The shared actuator may be an electric motor or a linear actuator such as a hydraulic cylinder. The hydraulic cylinder transmits its translation adjustment motion to the shared kinematic closing system. When pivotably supported, first and second locking hooks may be used as the first and second movable closing parts and the translation motion of the hydraulic cylinder is converted to rotary motion.

The shared actuator is advantageously controlled by control signals as a function of the storage state of the roof and/or the position of the lid. When multiple coupled pairs of locking devices are used, a single shared actuator may actuate all of the locking devices.

In an embodiment, the shared kinematic closing system is actuatable by the roof kinematic system or by a kinematic system for the lid. An independent actuator may be omitted in such an embodiment.

In an embodiment, the first movable closing part is a first locking hook and/or the second movable closing part is a second locking hook. Advantageously, both closing parts are identical or at least similar to simplify the synchronization of the motion of the closing parts. Embodying closing parts as locking hooks has the advantage that the motion of the locking hooks can be easily synchronized. In an embodiment, the first and/or second closing parts are respective closing slides with a fixing receptacle for producing a positive fit being associated with each closing slide. A corresponding guide member for controlling the motion of the closing slide may be provided so that the sliding motion of a closing slide does not have to be carried out in a strictly translationly manner.

In an embodiment, the shared kinematic closing system is a four-bar linkage kinematic system. When first and second locking hooks are used as the first and second movable closing parts, a possibility for implementing the four-bar linkage kinematic system lies in connecting the pivotably supported locking hooks to one another in an articulated manner via a coupling rod linked to both locking hooks. To ensure better engagement of an actuator with the coupling rod, it is advantageous for the coupling rod to be articulately connected to respective extension arms of the first and second locking hooks. In this manner, the coupling rod is further separated from the actual locking hooks and the rotary joints.

The above features, and other features and advantages of the present invention are readily apparent from the following detailed descriptions thereof when taken in connection with the accompanying drawings.

BRIEF DESCRIPTION OF THE DRAWINGS

FIG. 4 illustrates the first and second locking devices in their unlocked position with the roof being in its closed position over the vehicle interior;

FIG. 5 illustrates the first and second locking devices in their locked position with the roof being in its closed position over the vehicle interior and the storage compartment lid being in its closed position over the storage compartment;

DETAILED DESCRIPTION OF THE PREFERRED EMBODIMENT(S)

Figure 1:
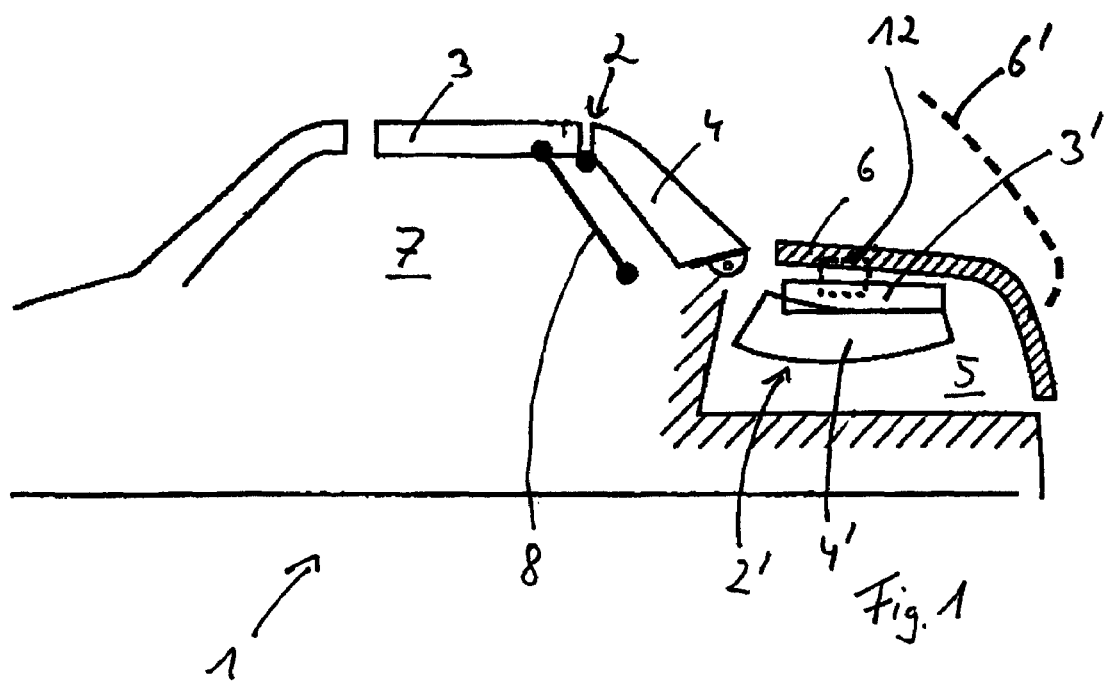
FIG. 1 illustrates a schematic of a convertible vehicle having a pivotable vehicle hardtop roof, and having a rear storage compartment and a storage compartment lid in accordance with an embodiment of the present invention.

In the figures, identical components or components with equivalent function are denoted by the same reference numerals.

Referring now to FIG. 1, a schematic of a convertible vehicle 1 in accordance with an embodiment of the present invention is shown. Vehicle 1 includes a hardtop roof 2, a rear storage compartment 5, and a storage compartment lid 6. Roof 2 includes a front rear part 3 and a rear roof part 4. Roof 2 is pivotably movable between a closed position in which the roof covers vehicle interior 7 and a stowed (or stored) position in which the roof is lowered into compartment 5 and stored therein. A storage compartment lid 6 is pivotable relative to compartment 5 to open and close over the compartment with or without roof 2 stored therein. That is, 6 is movable between a closed position in which the lid covers compartment 5 with or without roof 2 stored therein and an opened position in which the lid exposes the compartment so that the roof may be lowered and stored therein.

In FIG. 1, roof 2 is shown in its closed position covering interior vehicle space 7 as denoted by reference numeral 2 and is shown in the stored (or stowed) position inside compartment 5 as denoted by reference numeral 2'. A kinematic roof system 8 is connected between front roof part 3 and the body of vehicle 1 to swivel roof 2 between its closed and stored positions. In FIG. 1, front and rear roof parts 3, 4 in the closed position of roof 2 are respectively denoted by reference numerals 3, 4; and in the stored position of the roof are respectively denoted by reference numerals 3', 4'. In FIG. 1, lid 6 is shown in its closed position over compartment 5 as denoted by reference numeral 6 and is shown in its opened position (represented by a dashed line) relative to compartment 5 as denoted by reference numeral 6'. In the stored position of roof 2, front roof part 3' comes to rest above rear roof part 4' within compartment 5. Lid 6 swivels between its closed and opened positions in order to enable the swivel process of roof 2 between its closed and stored positions.

Figure 2:
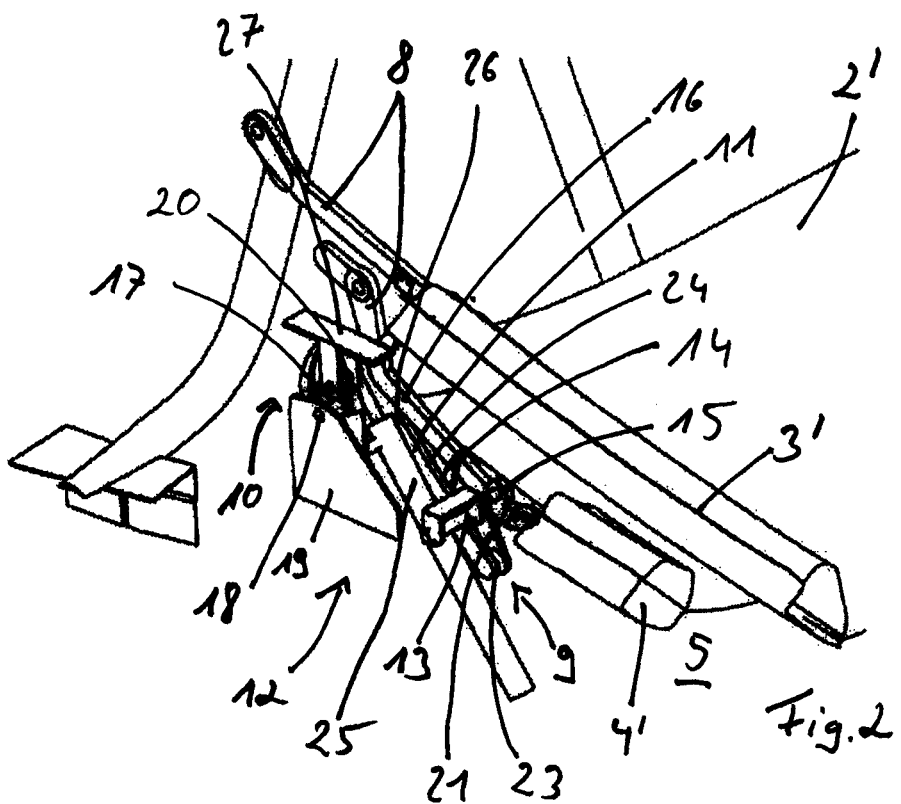
FIG. 2 illustrates first and second locking devices of the vehicle in their unlocked position with the roof being in its stored position within the storage compartment.
Figure 3:
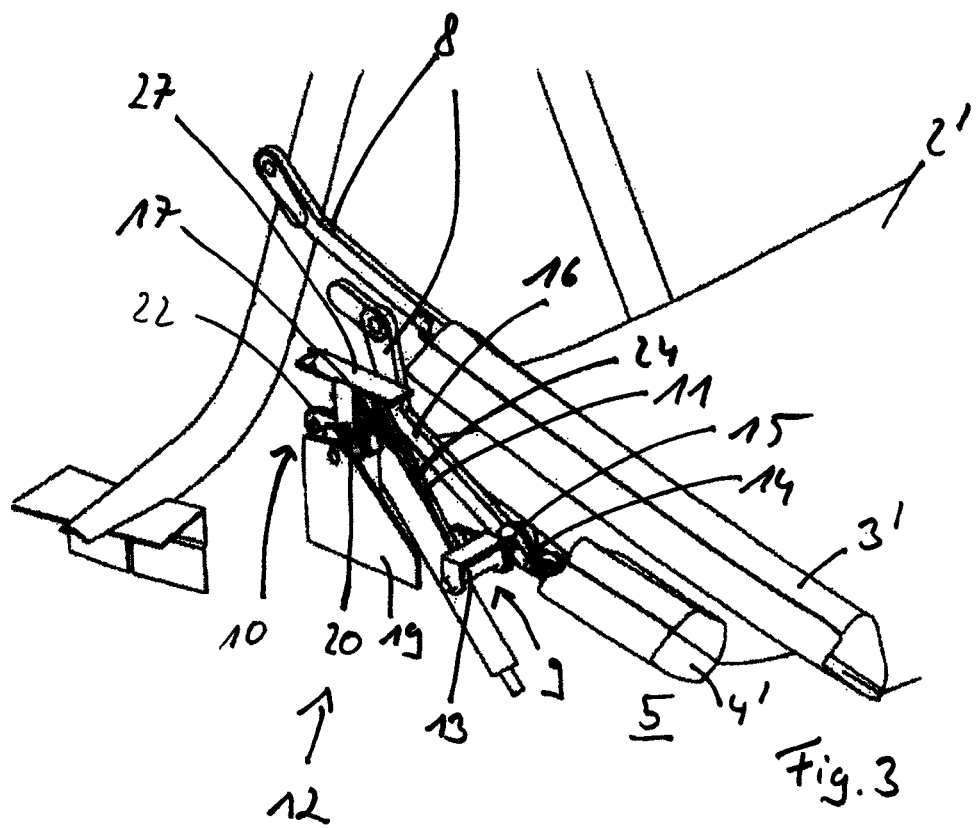
FIG. 3 illustrates the first and second locking devices in their locked position with the roof being in its stored position within the storage compartment and the storage compartment lid being in its closed position over the storage compartment.

Referring now to FIGS. 2 and 3, with continual reference to FIG. 1, first and second locking devices 9, 10 of vehicle 1 in accordance with an embodiment of the present invention are shown. Each of first and second locking devices 9, 10 is movable between a locked position and an unlocked position. When in its locked position, first locking device 9 locks roof 2' in its stored position within compartment 5. When in its locked position, second locking device 10 locks lid 6 in its closed position over compartment 5. FIG. 2 illustrates first and second locking devices 9, 10 in their unlocked position with roof 2' being in its stored position inside compartment 5. FIG. 3 illustrates first and second locking devices 9, 10 in their locked position with roof 2' being in its stored position inside compartment 5 and lid 6 being in its closed position over the compartment.

A shared kinematic closing (adjustment) system 11 kinematically couples first and second locking devices 9, 10 to one another. As such, first and second locking devices 9, 10 are first and second coupled locking devices. First locking device 9, second locking device 10, and kinematic adjustment system 11 form a unit denoted by reference numeral 12. In FIG. 1, a rectangle in dashed lines illustrates the position of unit 12 as being generally underneath lid 6.

FIGS. 2 and 3 further show kinematic roof system 8 for swiveling front and rear roof parts 3', 4'. In contrast to roof 2 in its closed position, front roof part 3' rests on rear roof part 4' within compartment 5 when roof 2' is in its stored position as shown in FIGS. 2 and 3. This has no effect on the mode of functioning of vehicle 1.

First locking device 9 for locking roof 2' inside compartment 5 includes a first movable closing part 14. First movable closing part 14 is movable between a locked position and an unlocked position. In an embodiment, first movable closing part 14 is a first locking hook 14. First locking hook 14 swivels about a first articulated joint 13 fixed to the vehicle body. As such, first locking hook 14 is fastened to the vehicle body. First locking hook 14 interacts with a first closing counterpart 15. In an embodiment, first closing counterpart 15 is a pivot 15. Pivot 15 is fixedly connected to a guide rod 16 of kinematic roof system 8.

Second locking device 10 for locking compartment lid 6 over compartment 5 includes a second movable closing part 17. Second movable closing part 17 is movable between a locked position and an unlocked position. In an embodiment, second movable closing part 17 is a second locking hook 17. Like first locking hook 14, second locking hook 17 swivels about an articulated joint. In this case, second locking hook 17 swivels about a second articulated joint 18 fixed to the body of vehicle 1. As such, second locking hook 17 is fastened to the vehicle body. In particular, second articulated join 18 is mounted on a plate 19 which is fixed to the vehicle body. Second locking hook 17 interacts with a second closing counterpart 20. In an embodiment, second closing counterpart 20 is a closing bolt 20. A retainer 27 fixedly connected to compartment lid 6 (not illustrated for reasons of clarity) holds closing bolt 20.

First locking hook 14 includes a first extension arm 21 (shown in FIG. 2) and second locking hook 17 includes a second extension arm 22 (shown in FIG. 3). First locking hook 14 and its extension arm 21 form a single part and second locking hook 17 and its extension arm 22 form a single part.

First extension arm 21 is articulately connected to a coupling rod 24 of shared kinematic closing system 11 via an articulated joint 23. In turn, coupling rod 24 is articulately linked to an actuator 25 via a linkage point 26. In an embodiment, actuator 25 is a hydraulic cylinder 25. Hydraulic cylinder 25 is articulately connected (not shown) to second extension arm 22 on the side of the hydraulic cylinder opposite from linkage point 26 between the hydraulic cylinder and coupling rod 24. In any case, the articulated attachment of coupling rod 24 and hydraulic cylinder 25 provides an articulated coupling of first and second locking hooks 14, 17.

Translation motion of hydraulic cylinder 25 causes both first and second locking hooks 14, 17 to swivel about their respective first and second articulated joints 13, 18. Traversal of hydraulic cylinder 25 upward and to the left according to the plane of the drawings of FIGS. 2 and 3 causes first and second locking hooks 14, 17 to swivel from an unlocked position (shown in FIG. 2) to a locked position (shown in FIG. 3). In its locked position, first locking hook 14 overlaps pivot 15, which is fixed to roof 2 via guide rod 16 for kinematic roof system 8, thereby locking the entire roof 2' in its stored position within 5. Likewise, in its locked position, second locking hook 17 overlaps closing bolt 20, which is fixedly connected to lid 6 via retainer 27, thereby locking lid 6 in its closed position over compartment 5. In this manner, lid 6 is prevented from being accidentally opened. Furthermore, vibrations of lid 6 due to vehicular motion are eliminated thereby minimizing driving noise.

Referring now to FIGS. 4 and 5, with continual reference to FIGS. 1, 2, and 3, first and second locking devices 9, 10 with roof 2 being in its closed position over vehicle interior 7 are shown. FIG. 4 illustrates first and second locking devices 9, 10 in their unlocked position with roof 2 being in its closed position over vehicle interior 7. FIG. 5 illustrates first and second locking devices 9, 10 in their locked position with roof 2 being in its closed position over vehicle interior 7 and lid 6 being in its closed position over compartment 5. As such, FIGS. 4 and 5 illustrate the same respective configurations illustrated in FIGS. 2 and 3 with the different being that roof 2 is in its closed position in FIGS. 4 and 5 and roof 2' is in its stored position within compartment 5 in FIGS. 2 and 3. As such, compartment 5 is empty in FIGS. 4 and 5.

First and second locking hooks 14, 17 are shown in their unlocked position in FIG. 4 First and second locking hooks 14, 17 are shown in their locked position in FIG. 5.

In FIG. 5, second locking hook 17 is in its locked position and fixes closing bolt 20 in place. In its locked position, first locking hook 14 is disengaged because pivot 15 has been swivelled upward and to the left in the plane of the drawing of FIG. 5 by guide rod 16 of roof kinematic system 8.

Figure 6:
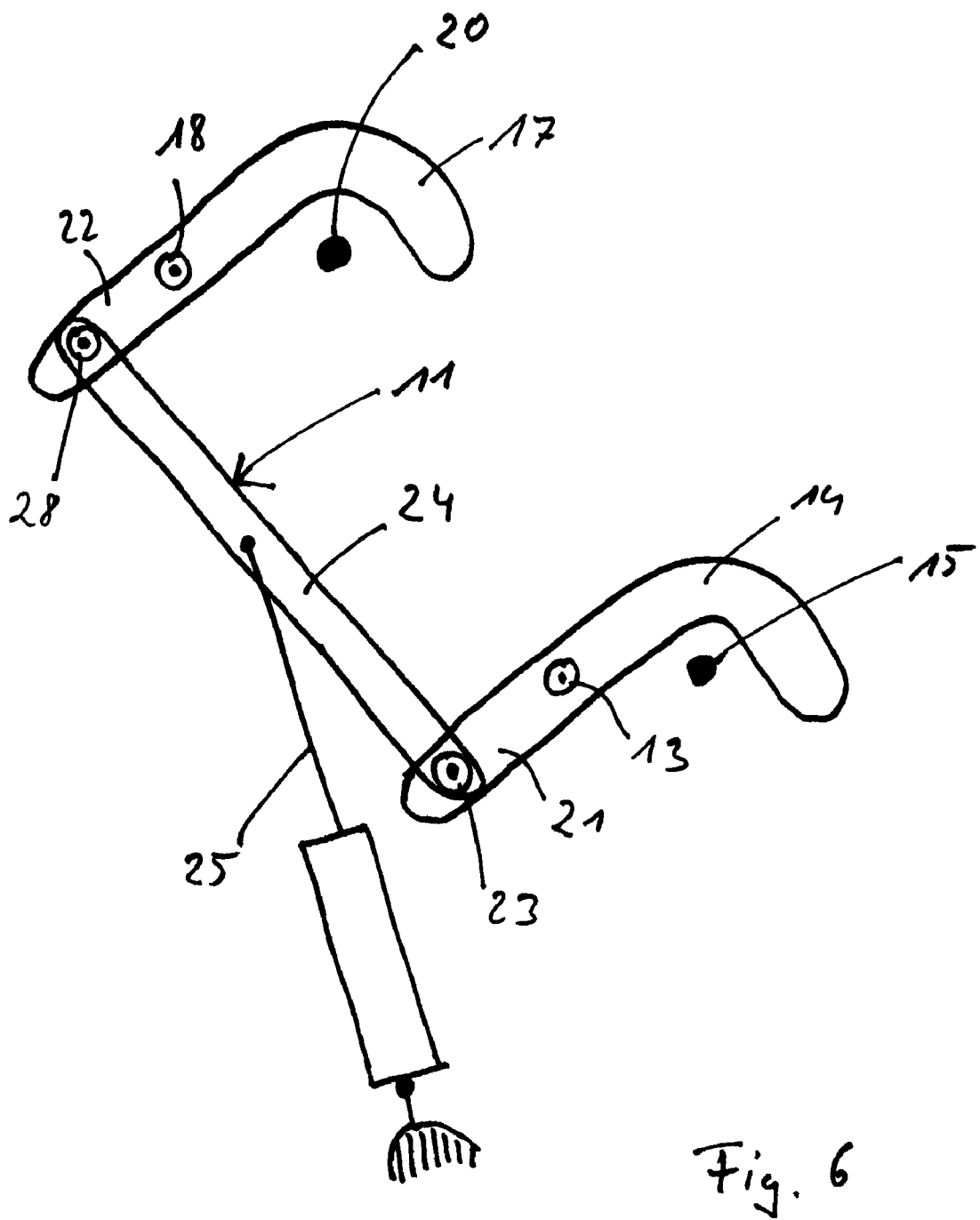
FIG. 6 illustrates a shared kinematic closing system of the vehicle for the first and second movable closing parts of the first and second locking devices.

Referring now to FIG. 6, with continual reference to FIGS. 1 through 5, shared kinematic closing system 11 for first and second locking hooks 14, 17 of first and second locking devices 9, 10 is shown. Shared kinematic closing system 11 provides a simplified coupling between first and second locking hooks 14, 17. First and second locking hooks 14, 17 are pivotably supported via respective articulated joints 13, 18 fixed to the body of vehicle 1. Each locking hook 14, 17 includes a respective extension arm 21, 22. Extension arms 21, 22 are articulately connected to one another via coupling rod 24. To this end, coupling rod 24 is linked to articulated joint 23 on first locking hook 14 and to an articulated joint 28 on second locking hook 17. Both locking hooks 14, 17 together with coupling rod 24 and the four articulated joints 13, 18, 23, and 28 form a four-bar linkage kinematic closing system.

Hydraulic cylinder 25 is articulately connected to coupling rod 24, which at its lower end in the plane of the drawing of FIG. 6 is linked in a fixed manner to the body of vehicle 1.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A convertible vehicle comprising:
    a rear compartment;
    a lid movable between a closed position in which the lid covers the compartment and an opened position in which the lid exposes the compartment;
    a roof movable between a closed position covering the vehicle interior and a stored position in which the roof is lowered into the compartment for storage therein;
    a roof kinematic system connected to the roof for moving the roof between its closed and stored positions;
    a first locking device having a first closing part movable between a locked position and an unlocked position;
    a second locking device having a second closing part movable between a locked position and an unlocked position;
    a shared kinematic closing system connects the first and second closing parts to synchronously move the first and second closing parts together between their locked and unlocked positions;
    wherein when the roof is in its stored position within the compartment and the lid is in its closed position over the compartment, the shared kinematic closing system moves the first and second closing parts to their locked position such that the first closing part interacts with the roof and locks the roof within the compartment and such that the second closing part interacts with the lid and locks the lid over the compartment.

2. The vehicle of claim 1 wherein:
the first closing part includes a first locking hook.

3. The vehicle of claim 2 wherein:
the second closing part includes a second locking hook.

4. The vehicle of claim 3 wherein:
the first and second locking hooks are fixed to the vehicle body.

5. The vehicle of claim 1 further comprising:
an actuator shared by the first and second locking devices, wherein the actuator drives the shared kinematic closing system to move the first and second closing parts between their locked and unlocked positions.

6. The vehicle of claim 5 wherein:
the actuator is a hydraulic cylinder.

7. The vehicle of claim 6 wherein:
the hydraulic cylinder is a linear actuator.

8. The vehicle of claim 1 wherein:
the shared kinematic closing system is a four-bar linkage kinematic system.

9. The vehicle of claim 3 wherein:
the first locking hook includes a first extension arm and the second locking hook includes a second extension arm, wherein the first and second extension arms are articulately connected to one another via a coupling rod of the shared kinematic closing system such that movement of the first and second locking hooks between their locked and unlocked positions occurs synchronously.

10. The vehicle of claim 1 further comprising:
a first closing counterpart fixed to the roof, wherein the first closing part engages the first closing counterpart when the first closing part is in it locked position, the roof is in its stored position within the compartment, and the lid is in its closed position over the compartment.

11. The vehicle of claim 10 wherein:
the first closing counterpart is fixed on the roof via a guide rod of the roof kinematic system.

12. The vehicle of claim 10 wherein:
the first closing counterpart is a pivot.

13. The vehicle of claim 10 further comprising:
a second closing counterpart fixed to the lid, wherein the second closing part engages the second closing counterpart when the second closing part is in its locked position, the roof is in its stored position, and the lid is in its closed position over the compartment.

14. The vehicle of claim 13 wherein:
the second closing counterpart is at a front region of the lid nearest to the vehicle interior.

15. The vehicle of claim 13 wherein:
the second closing counterpart is a bolt.

16. The vehicle of claim 3 further comprising:
a first closing counterpart fixed to the roof and a second closing counterpart fixed to the lid, wherein the first locking hook overlaps the first closing counterpart and the second locking hook overlaps the second closing counterpart when the first and second locking hooks ate in their locked position, the roof is in its stored position within the compartment, and the lid is in its closed position over the compartment.

* * * * *

UNITED STATES PATENT AND TRADEMARK OFFICE
CERTIFICATE OF CORRECTION

PATENT NO. : 7,497,499 B2  Page 1 of 1
APPLICATION NO. : 11/531195
DATED : March 3, 2009
INVENTOR(S) : Thomas Halbweiss et al.

It is certified that error appears in the above-identified patent and that said Letters Patent is hereby corrected as shown below:

Column 8, Line 53, Claim 16:
Delete "ate" and insert -- are --.

Signed and Sealed this

Fifth Day of May, 2009

JOHN DOLL
*Acting Director of the United States Patent and Trademark Office*